Nov. 27, 1945. O. FERN Re. 22,695

SHOE AND METHOD OF MAKING SAME

Original Filed May 20, 1941

INVENTOR
OSCAR FERN
BY
HARRIS, KIECH, FOSTER & HARRIS
Ward D. Foster
FOR THE FIRM
ATTORNEYS.

Reissued Nov. 27, 1945 Re. 22,695

UNITED STATES PATENT OFFICE 22,695

SHOE AND METHOD OF MAKING SAME

Oscar Fern, Los Angeles, Calif., assignor to Jules C. Fern, Harry Sobel, and Oscar Fern, copartners doing business as Fern Shoe Co., Los Angeles, Calif.

Original No. 2,318,846, dated May 11, 1943, Serial No. 394,304, May 20, 1941. Application for reissue May 4, 1944, Serial No. 534,085

25 Claims. (Cl. 36—19.5)

My invention relates to a shoe and method of constructing the same. Among the objects of my invention is the provision of a shoe which is extremely flexible, which cushions the foot of the wearer, and which is accurately fitted to and embraces the heel of the wearer. My invention contemplates the provision of great flexibility by omitting an insole from the shoe and employing a sock lining which is not lasted to the upper and which is secured to the upper only in the fore part of the shoe. My invention contemplates the provision of a cushioning shoe by including between the upper and outsole a cushioning intermediate sole or platform of substantial depth and formed of deformable material. My invention contemplates the provision of a shoe accurately fitted to the heel of the wearer by lasting the shoe rearwardly of the shank.

A purpose of my invention is to provide a shoe which fits the heel of the wearer snugly and comfortably throughout the life of the shoe by lasting the rearward portion of the shoe and including therein a counter molded or formed in a suitable manner to the desired shape and constructed of material sufficiently rigid to insure the retention of such shape for the life of the shoe.

Another object of my invention is to provide a shoe including a heel member extending beneath the arch of the wearer and having an arched opening in its lower surface while providing sufficient thickness of the heel member beneath the arch to support the wearer without reinforcement by a metal arch member or shank. Further, it is an object of my invention to provide a shoe of the wedge heel or intermediate sole type including a covered heel extending beneath the arch of the wearer, which may be of any desired shape and covered quickly and neatly without folds with material contrasting or harmonizing with the remainder of the shoe. In shoes of the wedge heel or intermediate sole type, if the covering for the wedge heel is secured to the lower edge of the upper before it is placed around the wedge heel, it is impossible to draw this cover around the wedge heel neatly unless the walls of the heel are substantially vertical. If the wedge heel is first covered and attached to an upper and insole, the flexibility of the shoe is lost by the resistance to bending presented by the insole and the inturned edges of the upper lasted thereto throughout the length thereof. My invention contemplates the provision of a shoe of the type described employing a wedge heel, the walls of which need not be vertical and which may be neatly covered while retaining extreme flexibility in the shoe by lasting only that portion of the shoe rearwardly of the shank to a shank member or insert extending only rearwardly of the shank. By such lasting of the rearward portion of the upper, I am able to include a counter molded or formed to perfectly embrace the heel and arch of the wearer and constructed of leather or composition sufficiently rigid to retain its shape for the life of the shoe, thus insuring a perfection and retention of fit impossible of accomplishment if the upper is not lasted.

Among other objects of my invention is the provision of a shoe which is appealing in appearance and inexpensive in manufacture, as well as the provision of a method of constructing such a shoe involving few steps and capable of performance with a minimum of skilled workmen.

An embodiment of my invention capable of providing the foregoing advantages and others is described in the following specification, which may be better understood with reference to the accompanying drawing in which Fig. 1 is a perspective view of the upper of the shoe of my invention with the lining and counter secured thereto;

Figure 4:
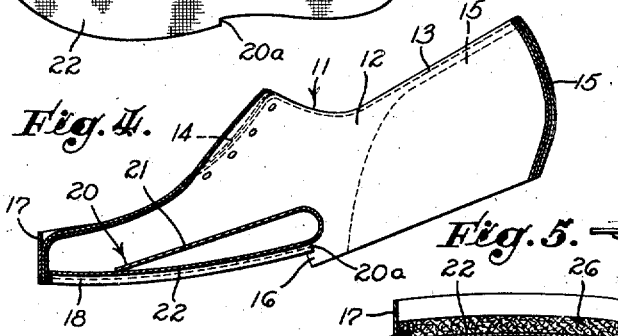
Fig. 4 is a central longitudinal sectional view of the upper illustrated in Fig. 3.

Referring to the drawing, which is for illustrative purposes only, the numeral 11 indicates an upper cut to provide the desired fit, particularly in the fore part of the shoe. The upper 11 is provided with a lining which may cover only the rear part of the upper or the entire length of the upper. I have illustrated a lining 12 covering the entire inner surface of the upper 11 and secured thereto by a row of stitching 13 extending adjacent the upper edge of the upper 11 and the edges of a forward lace opening 14 in the upper 11. A counter 15, best illustrated in Fig. 4, is installed between the upper 11 and the lining 12 in the rear portion of the shoe extending forwardly to the arch or shank portion of the shoe in known manner. The counter 15 is molded or formed in any suitable manner to comfortably and snugly fit the heel of the wearer and is made of leather, fibre, composition, or other suitable material of sufficient rigidity to retain its shape for the life of the shoe.

Figure 1:
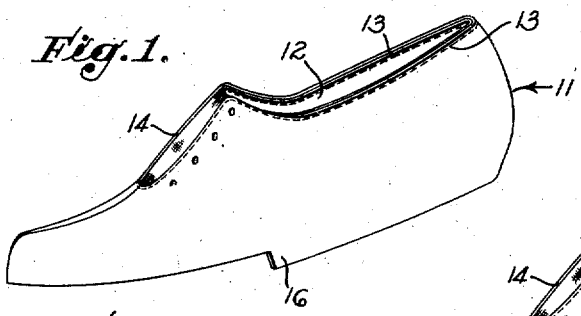
Figure 3:
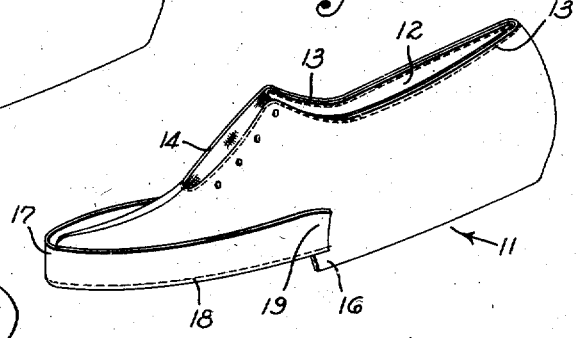
Fig. 3 is a perspective view of the upper illustrated in Fig. 1 with the half platform cover and the liner member secured to the fore part thereof.

As illustrated in Fig. 1, the upper 11 and liner 12 are provided with a depending portion 16 extending rearwardly from the shank of the shoe. Secured to the upper 11 forwardly of the depending portion 16 thereof is a platform cover 17. The cover is secured to the upper 11 by a row of stitching 18 with the outer surface of the cover 17 in contact with the outer surface of the upper 11. The cover 17 includes free end portions 19 extending in overlapping relationship with the depending portion 16 of the upper, the free end portions 19 being free of the upper for a purpose to be later described.

Figure 2:
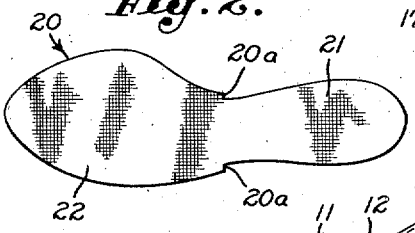
Fig. 2 is a plan view of the liner member.

The numeral 20 of Fig. 2 indicates a sock lining or liner member or liner, preferably of a single layer of fabric, having offsets 20*a* in its edges which act as guides in securing the liner to the inner surface of the lining 12 from the shank portion forwardly of the shoe. The liner 20 may be secured to the lining 12 and upper 11 by a row of stitching separate from the stitching 18, but I prefer to connect the liner 20 and platform cover 17 to the upper 11 and lining 12 by the single row of stitching 18. The liner 20 is secured with its upper surface in contact with the inner surface of the liner 12, and the rearward unsecured portion of the liner 20, indicated by the numeral 21, is folded upon the secured forward portion 22, as illustrated in Fig. 4.

Figure 5:
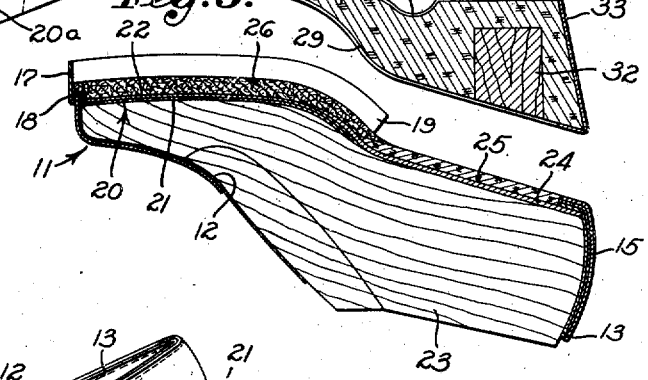
Fig. 5 is a central sectional view of the upper positioned upon a last and with the half platform cushion sole and filler positioned thereon and with the heel portion of the upper lasted to a shank member.

The upper 11, lining 12 with the cover 17, and liner 20 are then fitted upon a last 23, the last having temporarily secured thereto an insert or tuck or shank member of leather, fibre, or the like, indicated by the numeral 24 of Fig. 5. The lower edges of the upper 11, lining 12, and counter 15 are then lasted upon and secured to the lower surface of the shank member 24, and a filler 25 is spread upon the lower surface of the shank member 24 between the inturned edges of the upper, lining, and counter to present a level surface. The platform cover 17 being pulled downwardly so that it conceals the row of stitching 18, a platform 26 is positioned upon the lower surface of the liner 20 and preferably secured thereto by a suitable cement. The platform member 26 is made of a cushioning material, such as felt or the like, and extends over a portion of the shank member 24, being tapered in thickness at its rearward end to provide a smooth joint with the shank member, and being tapered in width rearwardly of the ends of the platform cover 17 to permit its concealment by the forward edges of a covered wedge heel when the heel is secured to the upper.

The lower edges of the platform cover 17 are then turned inwardly upon and secured, as by cement, to the lower surface of the platform member 26.

Figure 6:
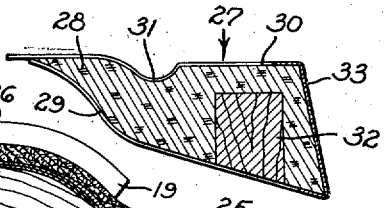
Fig. 6 is a vertical sectional view of a covered wedge heel ready for installation upon the upper illustrated in Fig. 5.

A wedge heel member 27, as illustrated in Fig. 6, is provided of such length as to include a portion 28 extending beneath the arch of the wearer and extending beneath the heel and shank portions of the upper. The wedge heel member 27 is provided with an upper surface 29 curved to conform to the heel and arch of the wearer and a lower surface 30 having therein an arch recess 31. The wedge heel member 27 is of such dimensions as to provide a thickness between the arch recess 31 and the upper surface 29 sufficient to support the weight of the wearer without deformation of the heel member 27, thus eliminating the necessity for including in the shoe a metal shank or arch-supporting member, while at the same time avoiding the heavy and awkward appearance of a flat-bottomed wedge heel. The wedge heel member 27 may be formed of cork or cork composition, or similar cushioning material, and preferably includes a dowel member 32 of wood or the like to facilitate the firm attachment of the wedge heel member 27 to the lasted upper 11. The wedge heel member is provided with a cover 33 of fabric, leather, or the like with its edges turned inwardly upon and secured, as by cement, to the upper and lower surfaces 29 and 30 of the wedge heel member 27. Since the heel cover 33 is not secured to the upper when it is applied to the wedge heel member 27, this cover 33 may be pulled and stretched upon the wedge heel member 27 to cover it smoothly and without folds, although the side walls of the wedge heel member 27 are not vertical.

The wedge heel member 27 with the cover 33 applied thereto is then secured to the lasted upper, preferably by cement, with its forward portion extending over the lower surface of the rearward portion of the platform member 26. The forward portion of the wedge heel member 27 is tapered to provide a smooth joint with the platform member 26. As the wedge heel member 27 is thus applied to the lasted upper, the free end portions 19 of the platform cover 17 are drawn around the forward portion of the wedge heel member and secured by cement to the heel cover 33, and the lower edges of the free end portions 19 are secured by cement to the lower surface 30 of the wedge heel member 27 and the heel cover 33 secured thereto. In this manner a joint of good appearance is made between the platform cover 17 and the heel cover 33. Instead of a wedge heel member, there may be employed a heel of any desired shape or style, and the upper 11 may be formed with openings at the toe or adjacent the shank, or at both the toe and shank.

Figure 7:
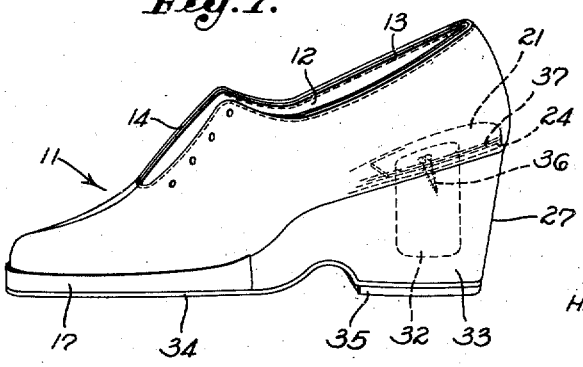
Fig. 7 is a perspective view of the completed shoe of my invention.

An outsole member 34 of the desired shape and of substantially uniform thickness throughout is then secured by cement to the lower surface of the platform 26, the heel member 27, the inturned edges of the platform cover 17, and the heel cover 33. Preferably the outsole member 34 is provided with a heel lift 35 of the desired thickness, which is secured thereto before the installation of the outsole upon the shoe. As illustrated in Fig. 7, the outsole 34 conforms to the arch recess 31 of the wedge heel member 27.

The shoe being removed from the last, a screw 36 may, if desired, be inserted through the shank member 24 and extended into the dowel member 32 of the wedge heel member 27. A heel slip 37 is then secured over the heel portion of the shank member 24, and the rearward portion 21 of the liner 20 is extended over and secured by cement to the heel slip 37 and the upper surface of the shank member 24.

From the foregoing it will be apparent that by eliminating the lasting operations customarily employed upon the fore part of a shoe, the method of my invention has reduced the expense and skilled labor required for the construction of the shoe of my invention. It will be seen also that, since the shoe includes no insole and since the edges of the upper forwardly of the heel portion of the shoe are not lasted upon and secured to the lower surface of an insole member, I have enormously increased the flexibility of the shoe. It will now be apparent also that the inclusion of the platform member 26 which is extremely flexible provides comfort to the foot of the wearer, while not detracting from the flexibility of the shoe.

The lasting of the rearward portion of the upper to the shank member 24 permits the inclusion of the counter 15 and the forming and retention of the rearward portion of the upper and the counter in a shape providing a perfect fit with the heel of the wearer, and the application of the heel cover 33 to the wedge heel member 27, prior to the attachment of the cover to the upper 11, permits the shaping of the cover neatly and without folds to wedge heels of any desired shape.

While those embodiments of the shoe and method of constructing the same, hereinabove described, are capable of performing the objects and providing the advantages primarily stated, my invention is not restricted to such embodiments, but includes departures therefrom coming within the scope of the claims which follow

I claim as my invention:

1. In a shoe, the combination of: an upper; a liner in said upper having a heel portion and having a forward portion with its edge turned downwardly in contact with the inner surface of said upper adjacent the lower edge of said upper forwardly of the shank; a counter in the heel portion of said upper; a half platform member of cushioning material; a platform cover with its outer surface in contact with the outer surface of said upper adjacent the lower edge of said upper forwardly of the shank and with its lower edge turned inwardly upon said half platform member; a row of stitching connecting the contacting portions of said upper, liner, and platform cover; an insert extending from the heel forwardly of the shank and under said heel portion of said liner, said upper rearwardly of the shank and said counter being lasted to said insert; a filler on the bottom of said insert between the lasted edges of said upper; a wedge heel member having in the lower surface thereof an arch recess, said member being of a thickness above said recess adapted to support the wearer; a covering for said heel member extending around the sides thereof and secured to the upper and lower surfaces thereof; means securing said heel member to said insert, the rearward portions of said platform cover overlapping and being secured to said covering for said heel member; an outsole secured to the lower surface of said heel member and said half platform member; and a heel lift secured to said outsole member.

2. In a shoe, the combination of: an upper; a liner in said upper having a heel portion and having a forward portion sewed to said upper with its edge turned downwardly in contact with the inner surface of said upper adjacent the lower edge of said upper forwardly of the shank; a half platform member of cushioning material; a platform cover sewed to said upper with its outer surface in contact with the outer surface of said upper adjacent the lower edge of said upper forwardly of the shank and with its lower edge turned inwardly upon said half platform member; an insert extending from the heel forwardly of the shank and under said heel portion of said liner, said upper rearwardly of the shank being lasted to said insert; a filler on the bottom of said insert between the lasted edges of said upper; a wedge heel member having in the lower surface thereof an arch recess, said member being of a thickness above said recess adapted to support the wearer; a covering for said heel member extending around the sides thereof and secured to the upper and lower surfaces thereof; means securing said heel member to said insert, the rearward portions of said platform cover overlapping and being secured to said covering for said heel member; and an outsole secured to the lower surface of said heel member and said half platform member.

3. In a shoe, the combination of: an upper; a liner in said upper having a heel portion and having a forward portion sewed to said upper with its edge turned downwardly in contact with the inner surface of said upper adjacent the lower edge of said upper forwardly of the shank; a half platform member of cushioning material; a platform cover sewed to said upper with its outer surface in contact with the outer surface of said upper adjacent the lower edge of said upper forwardly of the shank and with its lower edge turned inwardly upon said half platform member; an insert extending from the heel forwardly of the shank and under said heel portion of said liner, said upper rearwardly of the shank being lasted to said insert; a filler on the bottom of said insert between the lasted edges of said upper; a wedge heel member including a dowel member; a covering for said heel member extending around the sides thereof and secured to the upper and lower surfaces thereof; means extending into said dowel member and securing said heel member to said insert, the rearward portions of said platform cover overlapping and being secured to said covering for said heel member; and an outsole secured to the lower surface of said heel member and said half platform member.

4. In a shoe, the combination of: an upper; a liner in said upper having a heel portion and having a forward portion sewed to said upper with its edge turned downwardly in contact with the inner surface of said upper adjacent the lower edge of said upper forwardly of the shank; a platform member of cushioning material; a platform cover sewed to said upper with its outer surface in contact with the outer surface of said upper adjacent the lower edge of said upper forwardly of the shank and with its lower edge turned inwardly upon said platform member; an insert extending from the heel forwardly of the shank and under said heel portion of said liner, said upper rearwardly of the shank being lasted to said insert; a wedge heel member having in the lower surface thereof an arch recess, said heel member extending beneath said platform member; a covering for said heel member extending around the sides thereof and secured to the upper and lower surfaces thereof; means securing said heel member to said insert, the rearward portions of said platform cover overlapping and being secured to said covering for said heel member; and an outsole secured to the lower surface of said heel member and said platform member.

5. In a shoe, the combination of: an upper; a liner in said upper having a heel portion and having a forward portion secured to said upper with its edge turned downwardly in contact with the inner surface of said upper adjacent the lower edge of said upper forwardly of the shank; a platform member of cushioning material; a platform cover secured to said upper with its outer surface in contact with the outer surface of said upper adjacent the lower edge of said upper forwardly of the shank and with its lower edge turned inwardly upon said platform member; a shank member extending from the heel forwardly of the shank and under said heel portion of said liner, said upper rearwardly of the shank being lasted to said shank member; a wedge heel member; a covering for said heel member extending around the sides thereof; means securing said heel member to said shank member, said cover and said covering being secured together in overlapping relationship; and an outsole secured to the lower surface of said heel member and said platform member.

6. The method of constructing a shoe, which includes the steps of: sewing the forward portion of a liner to a fitted upper forwardly of the shank with the upper surface of said liner contacting the inner surface of said upper; sewing a half platform cover to said upper adjacent its lower edge and forwardly of the shank with the outer surface of said cover contacting the outer surface of said upper; lasting the upper rearwardly of the shank to an insert projecting under the forward portion of said liner; leveling the bottom of said insert between the lasted edges of said upper with a filler; securing the lower edges of said cover to the lower surface of a half platform; securing a cover to a wedge heel; attaching the covered wedge heel to said insert and the inturned edges of said upper; securing the ends of said half platform cover to said covered wedge heel; securing an outsole to the lower surface of said wedge heel and half platform; and securing the rearward portion of said liner to the upper surface of said insert.

7. The method of constructing a shoe, which includes the steps of: sewing the forward portion of a liner and a platform cover to an upper adjacent its lower edge forwardly of the shank, with the upper surface of the liner contacting the inner surface of said upper and with the outer surface of said cover contacting the outer surface of said upper; lasting the upper rearwardly of the shank to a shank member projecting under the forward portion of said liner; leveling the bottom of said shank member between the lasted edges of said upper with a filler; securing the lower edges of said cover to the lower surface of a half platform; attaching a wedge heel to said shank member and the inturned edges of said upper; securing the ends of said half platform cover to said wedge heel; securing an outsole to the lower surface of said wedge heel and half platform; and positioning the rearward portion of said liner above said shank member.

8. The method of constructing a shoe, which includes the steps of: securing the forward portion of a liner and a platform cover to an upper adjacent its lower edge forwardly of the shank, with the upper surface of the liner contacting the inner surface of said upper and with the outer surface of said cover contacting the outer surface of said upper; lasting the upper rearwardly of the shank to a shank member projecting under the forward portion of said liner; leveling the bottom of said shank member between the lasted edges of said upper with a filler; securing the lower edges of said cover to the lower surface of a half platform; securing a wedge heel to said shank member and the inturned edges of said upper; securing the ends of said cover to said wedge heel; securing an outsole to the lower surface of said wedge heel and half platform; and positioning the rearward portion of said liner above said shank member.

9. The method of constructing a shoe, which includes the steps of: sewing the forward portion of a liner and a platform cover to an upper adjacent its lower edge forwardly of the shank, with the upper surface of the liner contacting the inner surface of said upper and with the outer surface of said cover contacting the outer surface of said upper; positioning said upper, liner, and cover upon a last; lasting the upper rearwardly of the shank to an insert projecting under the forward portion of said liner; leveling the bottom of said insert between the lasted edges of said upper with a filler; securing the lower edges of said cover to the lower surface of a platform; securing a cover to a wedge heel; attaching the covered wedge heel to said insert and the inturned edges of said upper and said platform; securing the ends of said platform cover to said covered wedge heel; securing an outsole to the lower surface of said wedge heel and platform; and securing the rearward portion of said liner above said insert.

10. The method of constructing a shoe, which includes the steps of: sewing the forward portion of a liner and a platform cover to an upper adjacent its lower edge forwardly of the shank, with the upper surface of the liner contacting the inner surface of said upper and with the outer surface of said cover contacting the outer surface of said upper; positioning said upper, liner, and cover upon a last; lasting the upper rearwardly of the shank to an insert projecting under the forward portion of said liner; leveling the bottom of said insert between the lasted edges of said upper with a filler; securing the lower edges of said cover to the lower surface of a platform; securing a cover to a wedge heel; attaching the covered wedge heel to said insert and the inturned edges of said upper and said platform; securing the ends of said platform cover to said covered wedge heel; and securing an outsole to the lower surface of said wedge heel and platform.

11. The method of constructing a shoe, which includes the steps of: sewing a platform cover and the forward portion of a liner to a fitted upper adjacent its lower edge with the outer surface of said cover contacting the outer surface of said upper and the upper surface of said liner contacting the inner surface of said upper; positioning said upper upon a last; lasting said upper rearwardly of the shank to an insert projecting beneath said liner; securing the lower edges of said cover to the lower surface of a platform; securing a wedge heel to said insert and said platform and said platform cover; and securing an outsole to said wedge heel and platform.

12. The method of constructing a shoe, which includes the steps of: sewing a liner to an upper with the upper surface of said liner contacting the inner surface of said upper; sewing a platform cover to said upper with the outer surface of said cover contacting the outer surface of said upper; positioning said upper upon a last; lasting said upper rearwardly of the shank to an insert projecting beneath said liner; cementing the lower edges of said cover to the lower surface of a platform; securing a wedge heel to said insert and said platform and said platform cover; and securing an outsole to said wedge heel and platform.

13. The method of constructing a shoe, which includes the steps of: sewing the forward portion of a liner to a fitted upper forwardly of the shank with the upper surface of said liner adjacent the inner surface of said upper; sewing a half platform cover to said upper adjacent its lower edge and forwardly of the shank with the outer surface of said cover adjacent the outer surface of said upper; lasting the upper rearwardly of the shank to an insert projecting under the forward portion of said liner, said lasted portion of said upper extending forwardly of the ends of said half platform cover; cementing the lower edges of said cover to the lower surface of a half platform; securing a heel beneath said insert and the inturned edges of said upper; cementing the ends of said half platform cover to said heel; and cementing an outsole to the lower surface of said heel and half platform.

14. The method of constructing a shoe, which includes the steps of: securing the forward portion of a liner and a platform cover to an upper adjacent its lower edge forwardly of the heel portion, with the upper surface of the liner adjacent the inner surface of said upper and with the outer surface of said cover adjacent the outer surface of said upper; lasting the upper at the heel portion thereof to a shank member projecting under said liner; securing the lower edges of said cover under a half platform; securing a wedge heel beneath said shank member and the inturned edges of said upper; and securing an outsole beneath said wedge heel and said half platform.

15. The method of constructing a shoe, which includes the steps of: sewing the forward portion of a liner to a fitted upper forwardly of the shank with the upper surface of said liner adjacent the inner surface of said upper; sewing a half platform cover to said upper adjacent its lower edge and forwardly of the shank with the outer surface of said cover adjacent the outer surface of said upper; lasting the upper rearwardly of the shank, said lasted portion of said upper extending forwardly of the ends of said half platform cover; securing the lower edges of said cover to the lower surface of a half platform; and connecting an outsole to the lower surface of said half platform and to a heel.

16. The method of constructing a shoe, which includes the steps of: sewing the forward portion of a liner and a platform cover to a fitted upper, said liner being secured to said upper forwardly of the shank with the upper surface of said liner adjacent the inner surface of said upper, and said cover being secured to said upper adjacent its lower edge with the outer surface of said cover adjacent the outer surface of said upper; lasting the upper rearwardly of the shank; securing the lower edges of said cover to the lower surface of a platform; and securing an outsole beneath said platform.

17. The method of constructing a shoe, which includes the steps of: sewing the forward portion of a liner and a platform cover to a fitted upper, said liner being secured to said upper forwardly of the shank with the upper surface of said liner adjacent the inner surface of said upper, and said cover being secured to said upper adjacent its lower edge forwardly of the shank with the outer surface of said cover adjacent the outer surface of said upper; lasting the upper rearwardly of the shank to an insert projecting under the forward portion of said liner; securing the lower edges of said cover to the lower surface of a platform; and securing an outsole and heel beneath said platform and said insert.

18. The method of constructing a shoe, which includes the steps of: sewing the forward portion of a liner and a platform cover to a fitted upper, said liner being secured to said upper forwardly of the shank with the upper surface of said liner adjacent the inner surface of said upper, and said cover being secured to said upper adjacent its lower edge forwardly of the shank with the outer surface of said cover adjacent the outer surface of said upper; lasting the upper rearwardly of the shank to an insert projecting under the forward portion of said liner; leveling the bottom of said insert between the lasted edges of said upper with a filler; securing the lower edges of said cover to the lower surface of a platform; and securing an outsole and heel beneath said platform and said insert.

19. The method of constructing a shoe, which includes the steps of: sewing the forward portion of a liner and a half platform cover to a fitted upper, said liner being secured to said upper forwardly of the shank with the upper surface of said liner adjacent the inner surface of said upper, and said cover being secured to said upper adjacent its lower edge with the outer surface of said cover adjacent the outer surface of said upper; lasting the upper rearwardly of the shank to an insert projecting under the forward portion of said liner; cementing the lower edges of said cover to the lower surface of a half platform; and cementing an outsole to said half platform and attaching a heel to said insert.

20. In a shoe, the combination of: an upper lasted rearwardly of the shank; a liner in said upper having an unsecured heel portion and having a forward portion secured to said upper with its edge turned downwardly in contact with the inner surface of said upper adjacent the lower edge of said upper forwardly of the shank; a platform member; a platform cover secured to said upper with its outer surface in contact with the outer surface of said upper adjacent the lower edge of said upper and with its lower edge turned inwardly upon said platform member; and an outsole secured beneath said platform member.

21. In a shoe, the combination of: an upper; a liner in said upper having a heel portion and having a forward portion secured to said upper with its edge turned downwardly in contact with the inner surface of said upper adjacent the lower edge of said upper forwardly of the shank; a platform member; a platform cover secured to said upper with its outer surface in contact with the outer surface of said upper adjacent the lower edge of said upper and with its lower edge turned inwardly upon said platform member; a shank member extending from the heel forwardly of the shank and under said heel portion of said liner, said upper rearwardly of the shank being lasted to said shank member; an outsole secured beneath said platform member; and a heel secured beneath said shank member.

22. In a shoe, the combination of: an upper; a liner in said upper having a heel portion and having a forward portion sewed to said upper with its edge turned downwardly in contact with the inner surface of said upper adjacent the lower edge of said upper forwardly of the shank; a half platform member; a platform cover sewed to said upper with its outer surface in contact with the outer surface of said upper adjacent the lower edge of said upper forwardly of the shank and with its lower edge turned inwardly upon said half platform member; a shank member extending from the heel forwardly of the shank and under said heel portion of said liner, said upper rearwardly of the shank being lasted to said shank member; an outsole secured beneath said half platform member; and a heel secured beneath said shank member.

23. In a shoe, the combination of: an upper; a liner in said upper having a heel portion and having a forward portion secured to said upper with its edge turned downwardly in contact with the inner surface of said upper adjacent the lower edge of said upper forwardly of the shank; a platform member; a platform cover secured to said upper with its outer surface in contact with the outer surface of said upper adjacent the lower edge of said upper forwardly of the shank and with its lower edge turned inwardly upon said platform member; a shank member extending from the heel forwardly of the shank and under said heel portion of said liner, said upper rearwardly of the shank being lasted to said shank member; an outsole cemented to the lower surface of said platform member; and a heel attached to said shank member.

24. In a shoe, the combination of: an upper; a liner in said upper having a heel portion and having a forward portion secured to said upper with its edge turned downwardly in contact with the inner surface of said upper adjacent the lower edge of said upper forwardly of the shank; a counter in the heel portion of said upper; a half platform member; a platform cover secured to said upper with its outer surface in contact with the outer surface of said upper adjacent the lower edge of said upper forwardly of the shank and with its lower edge turned inwardly upon said half platform member; a shank member extending from the heel forwardly of the shank and under said heel portion of said liner, said upper rearwardly of the shank being lasted to said shank member; an outsole secured beneath said half platform member; and a heel secured beneath said shank member.

25. In a shoe, the combination of: an upper; a liner in said upper having a heel portion and having a forward portion secured to said upper with its edge turned downwardly in contact with the inner surface of said upper adjacent the lower edge of said upper forwardly of the shank; a half platform member; a platform cover secured to said upper with its outer surface in contact with the outer surface of said upper adjacent the lower edge of said upper forwardly of the shank and with its lower edge turned inwardly upon said half platform member; a shank member extending from the heel forwardly of the shank and under said heel portion of said liner, said upper rearwardly of the shank being lasted to said shank member; a filler on the bottom of said shank member between the lasted edges of said upper; an outsole secured beneath said half platform member; and a heel secured beneath said shank member.

OSCAR FERN.